(12) United States Patent
Marriott et al.

(10) Patent No.: US 7,819,152 B2
(45) Date of Patent: Oct. 26, 2010

(54) PNEUMATIC TIRE WITH TREAD HAVING ELECTRICALLY CONDUCTIVE COMPONENT UNDERLYING AND EXTENDING THROUGH ITS TREAD

(75) Inventors: Peter Robert Marriott, Warwickshire (GB); David Roger Jenkins, Northants (GB); Howard Michael Waldron, West Midlands (GB)

(73) Assignee: The Goodyear Tire & Rubber Company, Akron, OH (US)

( * ) Notice: Subject to any disclaimer, the term of this patent is extended or adjusted under 35 U.S.C. 154(b) by 914 days.

(21) Appl. No.: 11/349,833

(22) Filed: Feb. 8, 2006

(65) Prior Publication Data

US 2006/0180255 A1 Aug. 17, 2006

Related U.S. Application Data

(60) Provisional application No. 60/653,200, filed on Feb. 15, 2005.

(51) Int. Cl.
*B60C 1/00* (2006.01)
*B60C 11/00* (2006.01)
*B60C 19/08* (2006.01)

(52) U.S. Cl. ............. 152/152.1; 152/209.5; 152/DIG. 2

(58) Field of Classification Search ............ 152/152.1, 152/209.5, DIG. 2
See application file for complete search history.

(56) References Cited

U.S. PATENT DOCUMENTS

| 5,942,069 | A | 8/1999 | Gerresheim et al. | 156/128.1 |
| 6,367,525 | B1 * | 4/2002 | Hiruma et al. | 152/DIG. 2 |
| 6,415,833 | B1 * | 7/2002 | Komatsu | 152/DIG. 2 |

FOREIGN PATENT DOCUMENTS

| EP | 838353 | * | 4/1998 |
| EP | 853010 | * | 7/1998 |
| JP | 11-020426 | * | 1/1999 |
| JP | 2000-085316 | * | 3/2000 |

* cited by examiner

*Primary Examiner*—Steven D Maki
(74) *Attorney, Agent, or Firm*—Henry C. Young, Jr.

(57) ABSTRACT

This invention relates to a pneumatic rubber tire having a circumferential tread containing an outer tread rubber layer, wherein said outer tread rubber layer contains an outer tire running surface, comprised of an electrically insulating (poorly electrically conducting) rubber composition and wherein said tread additionally contains a circumferential tread component in a form of an inverted "T" configuration comprised of a relatively electrically conducting rubber composition (relative to said outer tread rubber strip) wherein the stem of said inverted "T" configured tread component extends through said outer tread rubber layer to its running surface to thereby provide a path of least electrical resistance through said outer tread strip to its running surface and wherein the base of said "T" configured tread component underlies a portion of said outer tread rubber layer and is less than, and therefore not entirely co-extensive with, the axial width of said outer tread rubber layer.

1 Claim, 1 Drawing Sheet

PNEUMATIC TIRE WITH TREAD HAVING ELECTRICALLY CONDUCTIVE COMPONENT UNDERLYING AND EXTENDING THROUGH ITS TREAD

The Applicants hereby claim the benefit of prior U.S. Provisional Application Ser. No. 60/653,200, filed on Feb. 15, 2005.

FIELD OF THE INVENTION

This invention relates to a pneumatic rubber tire having a circumferential tread comprised of a relatively non-electrically conductive rubber composition, wherein said tire tread contains an additional circumferential tread component, in a form of an inverted "T" configuration comprised of a relatively electrically conducting rubber composition comprised of a stem portion and a base portion, wherein said stem portion extends through said tread to its outer running surface to thereby provide a path of least electrical resistance through said tread, wherein said base portion underlies a portion of said tread is less than the axial width of said outer tread cap rubber layer. Alternatively, said tire tread further contains an underlying tread base rubber layer wherein said inverted "T" configured circumferential tread component is positioned between said tread and said underlying tread base layer or between two axially divided segments of said underlying tread base layer.

BACKGROUND OF THE INVENTION

Pneumatic tires typically have a circumferential rubber tread strip and said tread strip may be of cap/base layered construction. For said tread cap/base layered construction, the outer tread rubber cap layer contains a running surface (intended for ground-contacting) for the tire and the tread base layer underlies said tread rubber cap layer. Such tread cap/base layered construction is well known to those having a skill in such art.

In practice, said tread rubber cap layer may, in some instances, be comprised of an electrically insulating (poorly electrically conducting) rubber composition and said tread base layer comprised of a relatively electrically conductive rubber composition (relative to the rubber composition of said tread cap layer).

In such instance, it may be desired to provide a path of least electrical resistance between said tread rubber base layer through said outer tread cap layer to the running surface of said tread cap layer.

Numerous proposals have been made for providing a path of electrical resistance which extends though said electrically non-conductive outer tread rubber cap layer of a tire tread of a cap/base construction, such as, for example, a rubber strip of an electrically conductive rubber composition of the same rubber composition of and as an extension of an electrically conductive tread base layer rubber composition which underlies, and is substantially co-extensive with, said electrically non-conductive tread rubber cap layer. Exemplary of such proposals, which is not intended herein to be limited or all-inclusive, are, for example, U.S. Pat. No. 5,942,069.

For this invention, an improvement, which is intended to be a departure from such past practice, is an inclusion of an additional co-extruded, integral tread component of a specialized configuration which provides a path of least electrical resistance extending from said underlying tread base layer, through said outer tread cap layer to its running surface.

Said additional rubber tread component is of a circumferential inverted unitary "T" configuration comprised of a stem portion and a base portion, wherein its stem portion extends radially outward from its base portion through said outer tread cap rubber layer to said tread cap running surface, wherein its said base portion is positioned juxtapositioned to and underlies said tread cap rubber base layer and extends axially outwardly from both sides of said stem portion of said inverted "T" configured tread component to an extent less than the radial width of said tread cap layer.

Accordingly, a path of least electrical resistance is thereby provided which extends from the base of said additional inverted "T" configured tread component through said outer tread cap rubber layer to the running surface of said tread cap layer.

In practice the rubber composition of the tire tread rubber cap layer is electrically non conductive in a sense of containing a relatively minimal rubber reinforcing carbon black content (e.g. up to about 25 phr of rubber reinforcing carbon black) and the tire tread base layer and the said inverted "T" shaped tread component rubber composition extending through the tread cap is electrically more conductive (than said tread cap rubber composition) in a sense of having a more extensive rubber reinforcing carbon content (e.g. at least 40 phr of rubber reinforcing carbon black).

In the description of this invention, the term "phr" relates to parts by weight of an ingredient per 100 parts by weight of rubber, unless otherwise indicated.

The terms "rubber" and "elastomer" may be used interchangeably unless otherwise indicated. The terms "vulcanized" and "cured" may be used interchangeably unless otherwise indicated. The terms "compound" and "rubber composition" may be used interchangeably unless indicated. The term "carbon black" is used to refer to rubber reinforcing carbon blacks unless otherwise indicated. Exemplary rubber reinforcing carbon blacks may be referred to, for example, in the *Vanderbilt Rubber Handbook* (1978) on Pages 414 through 417.

DISCLOSURE AND PRACTICE OF THE INVENTION

In accordance with this invention, a pneumatic rubber tire is provided having a circumferential rubber tread:

wherein said circumferential rubber tread is comprised of:

(A) an outer tread cap rubber layer which contains an outer tread running surface (intended to be ground-contacting) wherein said outer tread cap rubber layer is comprised of a relatively electrically non-conductive conjugated diene-based rubber composition which contains up to about 25 phr of rubber reinforcing carbon black, and (B) an additional rubber tread component in a form of a circumferential inverted unitary "T" configuration comprised of a stem portion and a base portion, wherein said additional rubber tread component contains from about 40 to about 60 phr of rubber reinforcing carbon black, wherein its said stem portion extends radially outward from its said base portion through said outer tread cap rubber layer to said tread cap running surface, wherein the said base portion of said inverted "T" configured tread component underlies said tread cap rubber layer (e.g. juxtapositioned to said tread cap rubber layer) and extends axially outwardly from both sides of its said stem portion to an extent less than the radial width of said tread cap rubber layer, and preferably less than 50 percent of the radial width of said tread cap rubber layer, wherein said stem portion of said inverted "T" configured tire tread component provides a path of least electrical resistance from its said base portion through said tread cap rubber layer to said running surface of said tread cap rubber layer.

In further accordance with this invention, said circumferential tire tread additionally contains a tread base rubber layer:

wherein said tread base rubber layer underlies said tread cap rubber layer and is comprised of a relatively electrically conductive (relative to said tread cap rubber layer) conjugated diene-based rubber composition containing from about 50 to about 80 phr of rubber reinforcing carbon black, wherein said tread base rubber layer is axially divided into at least two (preferably two) individual segments and wherein said base portion of said inverted "T" configured tread component is positioned between and thereby adjoining the ends of two of said tread base rubber layer segments, wherein the axial width of said base portion of said inverted "T" configured tread component is less than 50 percent of the axial width of said tread base rubber layer.

In further accordance with this invention, said circumferential tire tread additionally contains a tread base rubber layer:

wherein said tread base rubber layer underlies said tread cap rubber layer and is comprised of a relatively electrically conductive (relative to said tread cap rubber layer) conjugated diene-based rubber composition containing from about 50 to about 80 phr of rubber reinforcing carbon black, wherein said base portion of said inverted "T" configured tread component is positioned between said tread cap rubber layer and said tread base rubber layer (in a manner to underlie said tread cap rubber layer and overlie said tread base rubber layer), wherein the axial width of said base portion of said inverted "T" configured tread component is less than 50 percent of the axial width of said tread base rubber layer.

In practice, said inverted "T" configured tread component is comprised of a rubber composition differing from the rubber composition of said tread base layer in the sense that its rubber reinforcing carbon black content is at least 10 phr greater than that of said tread base layer.

In practice, said tread cap rubber layer, said inverted "T" tread rubber component and said tread base rubber layer, if present, are co-extruded together as an integral composite of individual rubber compositions and subsequently co-cured together to form an integral tire tread composite, conventionally as a member of a tire assembly in which a tire assembly of tire components are co-cured together in a suitable mold under conditions of elevated temperature (e.g. from about 140° C. to about 180° C.) and elevated pressure.

In practice, the average width of the stem portion of said circumferential additional inverted "T" configured tread component desirably is in a range of from about 2 to about 10, more desirably from about 2 to about 5, millimeters (mm).

In practice, the average thickness of said base portion of said circumferential additional inverted "T" configured tread component is desirably in a range of from about 1 to about 2.5 millimeters (mm), more desirably from about 0.7 to about 1.5 mm.

In practice, the said tire rubber tread cap layer, tire rubber tread base layer and said additional inverted "T" configured tread rubber component of the tire tread are comprised of individual rubber compositions. Elastomers contained in such rubber compositions are desirably comprised of at least one conjugated diene based elastomer comprised of polymers of at least one of isoprene and 1,3-butadiene and copolymers of styrene with at least one of isoprene and 1,3-butadiene.

In practice, the rubber composition of said tire tread cap layer desirably contains from about 40 to about 120 phr reinforcing filler comprised of from about 5 to about 25 phr of rubber reinforcing carbon black and from about 25 to about 115 phr of amorphous, precipitated silica, together with a coupling agent for said precipitated silica having a moiety reactive with hydroxyl groups (e.g. silanol groups) contained on said precipitated silica and an other different moiety interactive with said conjugated diene-based elastomer(s).

In practice, the rubber composition of said tire tread base layer and the rubber composition of said additional inverted "T" tread component desirably contains from about 40 to about 90 phr (at least 50 phr for said tread base layer) of reinforcing filler comprised of from about 40 to about 90 phr of rubber reinforcing carbon black and from zero about 30, preferably zero, phr of amorphous, precipitated silica, together with a coupling agent for said precipitated silica having a moiety reactive with hydroxyl groups (e.g. silanol groups) contained on said precipitated silica and an other different moiety interactive with said conjugated diene-based elastomer(s).

In practice, the said rubber reinforcing carbon black for said tire tread cap rubber composition desirably has a dibutyl phthalate (DBP) value (ASTM D2414) in a range of from about 100 to about 145 cc/100 g together with an Iodine value (ASTM D1510) in a range of from about 80 to about 210 ml/100 g. Representative examples of such rubber reinforcing carbon blacks are, for example, N115, N220, N234 and N375.

In practice, the said rubber reinforcing carbon black for said tire tread base rubber composition desirably has a dibutyl phthalate (DBP) value (ASTM D2414) in a range of from about 90 to about 145 cc/100 g together with an Iodine value (ASTM D1510) in a range of from about 30 to about 170 ml/100 g. Representative of examples of such rubber reinforcing carbon blacks are, for example, N115, N234, N375 and N683.

In practice, the said rubber reinforcing carbon black for said additional tread component rubber composition (said inverted "T" component) desirably has a dibutyl phthalate (DBP) value (ASTM D2414) in a range of from about 90 to about 190 cc/100 g together with an Iodine value (ASTM D1510) in a range of from about 75 to about 250 ml/100 g. Representative examples of such rubber reinforcing carbon blacks are, for example, N115, N330, N375 and N472.

In practice, desirably the individual rubber compositions of said individual tire tread base layer and said additional inverted "T" configured tread rubber component contain a rubber reinforcing carbon black content of at least 40 phr (at least 50 phr for said tread base layer), depending somewhat upon the selection of the rubber reinforcing carbon black itself as hereinbefore addressed, and in a sufficient amount that is above the carbon black percolation point to thereby make the rubber composition relatively electrically conductive. The term "percolation point" is well known to those having skill in such art.

BRIEF DESCRIPTION OF THE DRAWINGS

Drawings in a form of FIG. 1, FIG. 2 and FIG. 3 are provided herewith to illustrate a partial cross-section of a pneumatic tire having a tread which contains an outer tread cap rubber layer and an additional inverted "T" configured tire tread rubber component to provide a path of least electrical resistance through said tread cap rubber layer to its outer running surface.

THE DRAWINGS

Figure 1:
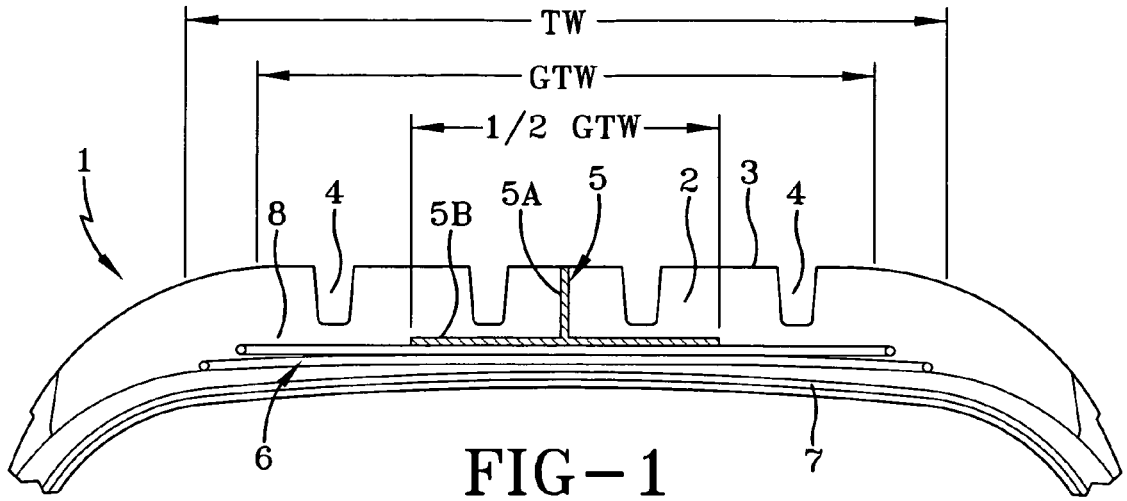

Referring to the Drawings, a partial cross-section of a pneumatic tire (1) is presented with a circumferential rubber tread component which contains an outer tread rubber cap rubber layer (2) with an outer running surface (3) intended to be ground-contacting and tread grooves (4).

A plurality, namely two, circumferential tread belts (6), composed of metal (steel) cord reinforced rubber, which underlie the tread component.

The carcass of the tire contains a plurality of carcass plies (7), composed of cord reinforced rubber.

The outer tread cap rubber cap layer (2) is composed of a relatively electrically non-conductive rubber composition which contains up to 25 phr of rubber reinforcing carbon black.

An additional tread component (5) is provided in a form of a unitary inverted "T" configuration having a stem portion (5A) and a base portion (5B).

The average width of the stem portion (5A) is about 4 mm and the average thickness of said base portion (5B) is about 1.2 mm.

The additional inverted "T" configured tread component (5) is composed of a relatively electrically conductive rubber composition, relative to the electrical conductivity of said tread cap rubber layer (2) which contains at least 40 phr of rubber reinforcing carbon black.

The relatively short base (5B) of said inverted "T" configured tread component (5) underlies said tread cap rubber layer (2) and is shown as being less than 50 percent of the radial ground-contacting (GTW) width of the tread cap layer (2), and significantly less than the overall tread width (TW) of the tread cap rubber layer.

The stem (5A) of said inverted "T" configured tread component (5) provides a path of least electrical resistance from its base (5B) thereof through the tread cap rubber layer (2) to the running surface (3).

In FIG. 1, the tire tread component is shown with said inverted "T" configured tread component (5) positioned in a manner to underlie said tread cap rubber layer (2) and overlie the tread belt plies (7) in the absence of tread base layer. The relatively short base (5B) of the inverted "T" configured tread component (5) is shown as being less than 50 percent of the radial ground-contacting width (GTW) of the tread cap layer (2).

Figure 2:
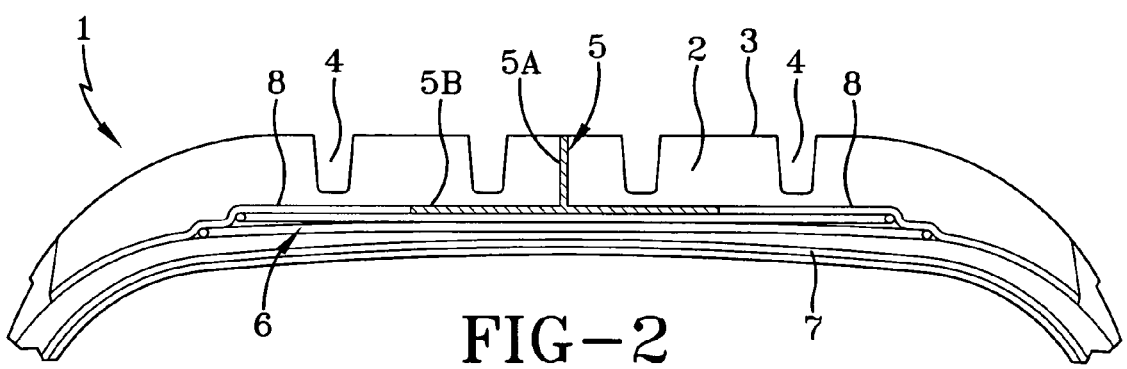

In FIG. 2 the tread component is shown with a tread base rubber layer (8) divided into two segments with the base (5B) of the inverted "T" configured tread component (5) positioned between ends of the said tread base rubber layer (8) segments. The combination of tread base layer (8) and base (5B) of the inverted "T" component (5) underlies the tread cap layer (2) and, basically, together extend the radial width of the tread cap layer(2), provided, however, that the rubber composition of the tread base layer (8) differs from the base (5B) of said inverted "T" component (5) in that its rubber reinforcing carbon black content is at least 10 phr greater than the rubber reinforcing carbon black content of said inverted "T" tread component. The relatively short base (5B) of the inverted "T" configured tread component (5) is shown as being less than 50 percent of the radial ground-contacting width (GTW) of the tread cap layer (2).

Figure 3:
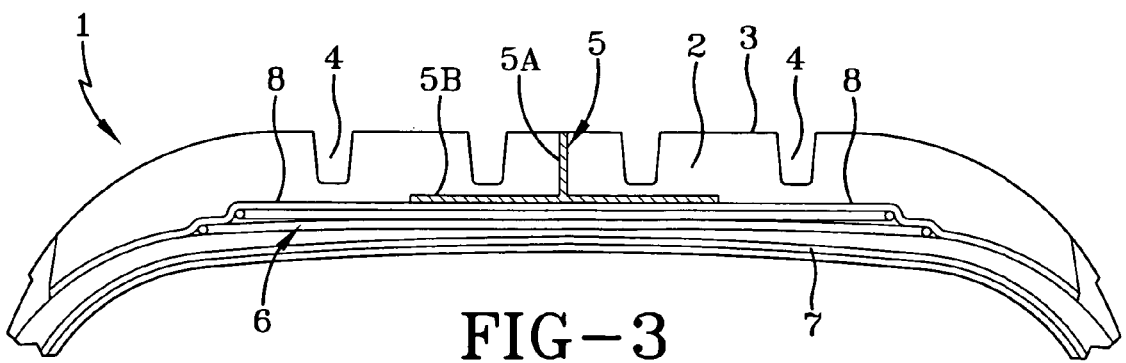

In FIG. 3, the tread component is shown with a unitary tread base rubber layer (8) with the inverted "T" configured tread component (5) overlaying said unitary tread base rubber layer (8), wherein the relatively short base (5B) of the inverted "T" configured tread component (5) is shown as being less than 50 percent of the radial ground-contacting width (GTW) of the tread cap layer (2).

The selectively positioned inverted "T" configured additional tire component (5), with a combination of its relatively short base (5B), namely less than 50 percent of the radial width of the tread cap layer (2) intended to be ground-contacting (GTW) together with its stem (5A) extending through, and not around the tread cap layer (2), to thereby divide the tread cap layer (2), and thereby provide a path of least electrical resistance from the inverted "T" configured tire component's base (5B) to the running surface (3) of the tread cap layer (2) is considered herein as being novel and a departure from past practice.

It is readily understood by those having skill in the art that the rubber compositions of the respective components of the tire, particularly the aforesaid tire tread rubber cap layer, tire tread rubber base layer and additional inverted "T" configured tread component would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, resins including tackifying resins, and plasticizers, fillers, pigments, fatty acid, zinc oxide, waxes, antioxidants and antiozonants. As known to those skilled in the art, depending on the intended use of the sulfur vulcanizable and sulfur vulcanized material (rubbers), the additives mentioned above, where used, may be selected and used in conventional amounts.

Typical amounts of tackifier resins, if used, may comprise for example about 0.5 to about 10 phr, usually about 1 to about 5 phr. Typical amounts of processing aids if used may for example comprise 1 to 20 phr. Typical amounts of antioxidants may comprise about 1 to about 5 phr. Representative antioxidants may be, for example, diphenyl-p-phenylenediamine and others, such as, for example, those disclosed in the *Vanderbilt Rubber Handbook* (1978), Pages 344 through 346. Typical amounts of antiozonants comprise about 1 to about 5 phr. Typical amounts of fatty acids, if used, which can include stearic acid may for example comprise about 0.5 to about 3 phr. Typical amounts of zinc oxide may comprise for example about 2 to about 6 phr. Typical amounts of waxes, if used, may comprise for example about 1 to about 5 phr. Microcrystalline waxes might used. Typical amounts of peptizers, if used, may comprise for example about 0.1 to about 1 phr. Typical peptizers may be, for example, pentachlorothiophenol and dibenzamidodiphenyl disulfide. The presence and relative amounts of the above additives are considered to be not an aspect of the present invention unless otherwise indicated.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from, for example, about 0.5 to about 4 phr, with a range of from about 0.5 to about 2.2 often being desired.

Accelerators are used to control the time and/or temperature required for vulcanization and to improve the properties of the vulcanizate. For example, a single accelerator system may be used, i.e., primary accelerator. Conventionally, a primary accelerator may be used, for example, in an amounts ranging from about 0.5 to about 2.0 phr. Alternately combinations of two or more accelerators might be used which the primary accelerator is generally used in the larger amount (0.5 to 2 phr), and a secondary accelerator which is generally used in smaller amounts (0.05 to 0.50 phr) in order to activate and to improve the properties of the vulcanized rubber. Representative types of accelerators might be, for example, disulfide, guanidine, thiuram, and sulfenamide based sulfur vulcanization accelerators. Preferably, the primary accelerator is a sulfenamide. If a second accelerator is used, the secondary accelerator is preferably a guanidine, dithiocarbamate or thiuram based compound. The presence and relative amounts of sulfur vulcanizing agent and accelerator(s) are not considered to be an aspect of this invention unless otherwise indicated.

Sometimes one or more of the antioxidants and antiozonants may be more simply referred to as antidegradants.

The tire can be built, shaped, molded and cured by various methods which will be readily apparent to those having skill in such art.

The prepared tire of this invention is conventionally shaped and cured by methods known to those having skill in such art.

EXAMPLE I

Tires of size 195/60R15 are prepared having treads of cap/base construction, with an inclusion of the said inverted "T" configured additional tread component to provide said path of least electrical resistance in a manner illustrated by FIG. 3 of the accompanying Drawings.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic rubber tire having a circumferential rubber tread wherein said circumferential rubber tread is comprised of:

(A) an outer tread cap rubber layer which contains an outer tread running surface wherein said outer tread cap rubber layer is comprised of a relatively electrically non-conductive conjugated diene-based rubber composition which contains up to about 25 phr of rubber reinforcing carbon black, wherein said circumferential tire tread additionally contains a tread base rubber layer underlying said outer tread cap rubber layer comprised of a relatively electrically conductive conjugated diene-based rubber composition containing from about 50 to about 80 phr of rubber reinforcing carbon black, and (B) an additional rubber tread component in a form of a circumferential inverted unitary "T" configuration comprised of a stem portion and a base portion, wherein said additional rubber tread component contains from about 40 to about 60 phr of rubber reinforcing carbon black, wherein its stem portion extends radially outward from its base portion through said outer tread cap rubber layer to said tread cap running surface to thereby divide said outer tread cap rubber layer, wherein said base portion of said inverted "T" configured tread component underlies and is juxtapositioned to said tread cap layer and extends axially outwardly from both sides of said stem portion an extent of less than 50 percent of the radial ground contacting width of said tread cap rubber layer and wherein the axial width of said base portion of said inverted "T" configured tread component is less than 50 percent of the axial width of said tread base rubber layer, wherein said stem portion of said inverted "T" configured tire tread component has a width in a range of from about 2 to about 5 millimeters extending through said tread cap rubber layer to its running surface and provides a path of least electrical resistance from the said base portion through said tread cap rubber layer to the running surface of said tread cap rubber layer, wherein said tread base rubber layer is divided into two segments and the base portion of said inverted "T" configured tread component is positioned entirely between and to thereby join the ends of said two segments of said tread base rubber layer in a manner that both of said base portion of said inverted "T" configured tread component and said segmented tread base rubber layer underlie and are juxtapositioned to contact said tread cap rubber layer.

* * * * *